April 8, 1947.  E. L. SINCLAIR ET AL  2,418,673
METHOD FOR CATALYTIC CONVERSION OF HYDROCARBONS
Filed May 27, 1943
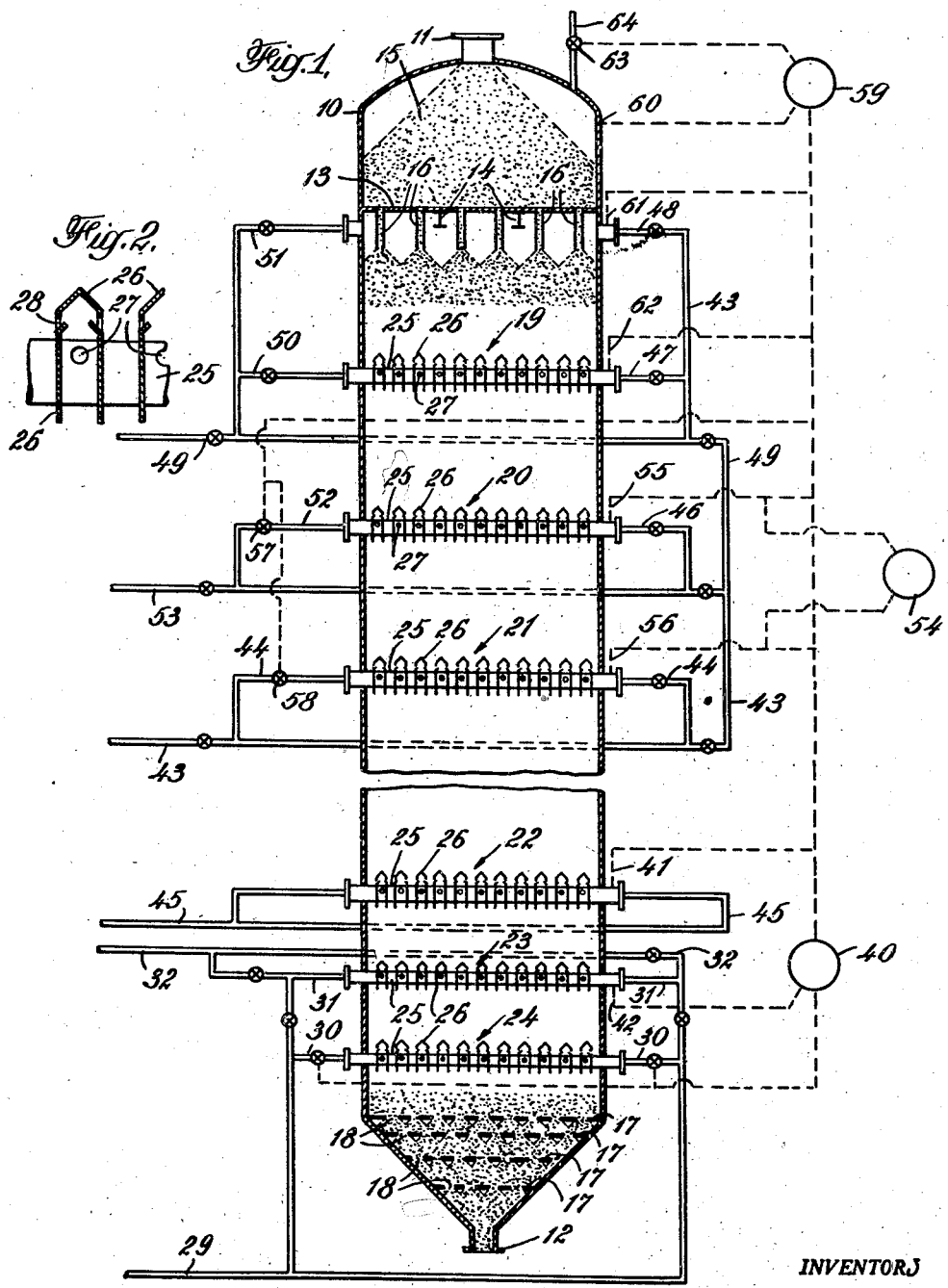
INVENTORS
EDWARD L. SINCLAIR
BY WILLIAM A. HAGERBAUMER
ATTORNEY Patented Apr. 8, 1947

2,418,673

UNITED STATES PATENT OFFICE

2,418,673

METHOD FOR CATALYTIC CONVERSION OF HYDROCARBONS

Edward L. Sinclair, Philadelphia, and William A. Hagerbaumer, Brookline, Pa., assignors to Socony-Vacuum Oil Company, Incorporated, a corporation of New York Application May 27, 1943, Serial No. 488,781

6 Claims. (Cl. 196—52)

This invention has to do with methods and apparatus for the conversion of hydrocarbons in the presence of a particle-form catalytic contact mass.

As is well known, when a hydrocarbon fraction, such as a gas oil, boiling substantially between about 500° F. and 750° F., in vapor form, at temperatures of the order of about 800° F. and above, usually about 850–875° F., is brought into contact with a particle form solid contact mass of the nature of fuller's earth or related clay-like materials, a substantial conversion of gasoline occurs. This operation is typical of the operations with which this invention is concerned, and will be used herein in an exemplary manner. It is to be understood, however, that this invention is not limited thereto, but is applicable to any reaction of hydrocarbon conversion, or of treating, or to any other reaction which may be carried out in a like manner.

More recently, such reactions have been carried out in a set up wherein the particle form solid contact mass is moved in a flowing stream cyclically through two zones, in one of which the desired reaction occurs, and in the other of which the spent contact mass material from the first zone is regenerated prior to its return to the first, or reaction zone. This invention is concerned with the reactor zone of such operations.

In such reaction, two of the variables having to do with the results to be accomplished are rate of flow of reactant through the contact mass, and amount of exposure of reactants to contact mass. It frequently becomes desirable to effect changes in some of these variables for specific purposes, and it is a major object of this invention to provide a method of handling such reactions and a reaction apparatus in which a high degree of flexibility is provided in the relative amounts of hydrocarbon and of contact mass in contact in the reaction zone. The objects of this invention may be more readily understood by reference to the drawings attached hereto of which Figure 1 is a vertical view, partially in section, of a typical reactor and manifolding arrangement according to this invention and Figure 2 is a cross-sectional view of one of the elements shown in Figure 1.

Turning to Figure 1, 10 is a vertical reactor to which a particle form solid contact mass material is fed through pipe 11 and from which that material is removed through pipe 12. A short distance below the top of this reactor, there is a partition 13, supported by beams 14, thus defining a space 15 which acts as a preliminary storage and distributing zone for this contact mass material which flows downwardly into the reactor through a series of pipes 16 which are spaced appropriately and uniformly over the area of plate 13. Below this level, a contact mass material flows downwardly through the reactor, its rate of flow being subject to external control. Near the bottom of the reactor, there are a series of plates 17, each equipped with orifices 18 which are to insure uniform downward motion of the contact mass material throughout all portions of the cross section of the reactor 10 by first withdrawing the contact mass therefrom through a plurality of uniformly distributed orifices in upper plate 17 and then successively, since each plate in descending order has a lesser number of orifices, combining this multitude of streams into a single discharge stream. Within the reactor, spaced at several different vertical levels, there are a series of reactant distribution and collection grids, 19, 20, 21, 22, 23 and 24, the construction of all of which is generally similar and may be understood by referring to the uppermost grid 19, a portion of which is shown in magnified form in Figure 2. Reading Figure 2 for the moment together with Figure 1, we find that the grid is constructed of a transverse duct 25 extending from wall to wall within the reactor and terminating external to the reactor upon either side. Mounted transversely to this duct 25, are a series of inverted troughs 26, likewise extending from wall to wall within the reactor but in a direction transverse to that of duct 25. Each of these troughs has the form of an open bottomed gable roofed channel as may be seen more clearly in Figure 2. In the transverse duct 25, below each trough 26, there is an orifice 27. The trough 26 may, if desired, be equipped with one or more slots or louvers 28. This grid structure may be utilized either for distributing fluid reactants within the contact mass in the reactor or for collecting fluid reactants from within the contact mass, and removing them from the reactor. When utilized as an inlet distributor, the reactant will be introduced through the transverse duct 25, flow out through orifice 27, into the space under troughs 26 and then flow out into the contact mass, either through the open bottom or through such slots 28 as may be provided. It will be noted that this achieves a uniform distribution of reactant across the cross section of the reactor. When used as a collector grid, the flow of reactant products is reverse to the flow of reactant described above and thus an equally good uniform withdrawal of reaction products from all portions of the reactor is accomplished. The solid contact mass material flows downwardly between and around the troughs 26. Other forms of grid with similar performance may be used.

At the bottom of the reactor, the two grids 23 and 24 are used for the purpose of purging the contact mass of volatile reaction products and reactants before it leaves the reaction zone. To do this, steam or another suitable inert gas is introduced through pipe 29 and passes through pipes 30, 30 into grid 24 and thence upwardly through the contact mass material to be collected by grid 23 and removed through pipes 31, 31 and pipe 32. In order to prevent any undesirable passage of reactant materials into the purging zone, there is provided a differential pressure control instrument 40, which instrument observes the pressure in the adjacent reaction zone at point 41 and the pressure in the purging zone at 42 and so controls the valves in line 30 as to maintain either a substantial equivalency of pressure in those zones or any desired excess of pressure in the purging zone. In accordance with our application Serial No. 488,780 there is provided in the reactor a means whereby any portion of the contact mass therein may be utilized for reaction and this provision is so made that the contact of the reactant and of the contact mass may be either concurrent, that is, with reactants and contact mass flowing through the reactor in the same direction, or countercurrently. In this drawing, assuming that concurrent flow is desired, the reactant vapors will be introduced by pipe 43. In case it is desired to use only the bottom portion of the height of the reactor, those reactant vapors will be introduced through pipes 44 into grid 21 to flow downwardly through the contact mass and to be removed through grid 22 and pipe 45. In case a greater portion of the contact mass in the reactor is desired to be used, the reactant vapors may be introduced at higher levels as to grid 20 through pipe 46, to grid 19 through pipe 47, or through pipe 48 to the open space at the top of the reactor surrounding pipes 16 which space may be utilized for similar uniform introduction of reactant to or removal of reactant from the contact mass. It will be obvious by reversing the functions of pipes 43 and 45 and the appropriate grids, that countercurrent flow through any desired height of contact mass material may be accomplished.

So far, the apparatus and the methods by which it may be used, are only the equivalent of that disclosed in our previously mentioned application Serial No. 488,780. It will be observed that in case only a portion of the height of the reactor is used, there remains a very considerable volume of reactor content of contact mass which is not being utilized. It so happens that there are many other similar reactions for which it may be utilized without seriously impairing the ability of the contact mass to carry out the main reaction. For example, it is frequently desirable for various purposes, to re-treat or re-form or re-crack the gasoline-like products of a first catalytic cracking reaction, and in many cases this retreatment does not so degrade the catalyst as to render it inactive for the principal purpose of cracking. Various other combinations of operations exist which may be so used, and it is a major purpose of this invention to provide methods and apparatus whereby a single stream of contact mass material in a single reactor may be consecutively utilized for the accomplishment of two or more separate conversions of hydrocarbons without substantial admixture of reactants and reaction products other than coke arising from the separate reactions. To this end the unutilized portion of the reactor may be used as follows.

Assuming that one reaction is being conducted in the lower part by introducing reactants through 21, and removing them through 22. Another reaction may be conducted in any portion of the remaining height of the reactor as follows. Secondary reactants may be introduced through pipe 49 and may be led into the reactor through grid 19 and pipes 47 or 50 or into the space at the top surrounding pipes 16 through pipes 48 or 51, to flow downwardly through the reactor and be removed therefrom by pipes 46 or 52, products of reaction to be removed from the system through pipe 53. It will also be obvious that this section of the reactor can be operated with countercurrent flow by exchanging the functions of pipes 49 and 53 and appropriate grids. It will also be understood that more inlet and outlet grids may be provided than those shown in the drawing and that by proper arrangement of manifolds and valves, a most complete utilization of the column of contact mass can be made in this manner.

An important consideration is the prevention of substantial admixture of the materials being treated and the products originating in each reaction zone. To this end there is installed a second differential pressure control 54 which control instrument observes the pressure in the upper reaction zone at point 55 and the pressure in the lower reaction zone at point 56 and by proper connection to a valve controlling either of said reaction zones, or, if desirable, to valves controlling both of said reaction zones such as valves 57 and 58 maintains a substantial equilibrium of pressure between the adjacent points of the two zones to prevent flow of materials other than contact mass and the coke it carries from one into another. It is true that there will be some amount of such materials adsorbed upon the flowing contact mass material, but it has been found that this amount is not sufficiently great to impair the operation when properly related reactions are being carried on in adjacent zones. A single further control is utilized consisting of a differential pressure control instrument 59 which observes first at point 60 the pressure within contact mass storage space 15 and through appropriate connections as at 61, 62, 55, 56, the pressure at the uppermost level which is being used for reaction. If, for example, only the main reaction is being carried out and the upper portion of the reaction is entirely unutilized for a secondary reaction, it will observe the pressure at point 56. If, for example, a main reaction is carried out in the zone between grids 21 and 22 and the secondary reaction is being carried out in the zone between grids 19 and 20, then the other point of reaction, namely, that uppermost point of the reactor at which the reaction is being carried out will be point 62. Observing these two pressures, the differential pressure control instrument 59 then so controls valve 63 in pipe 64, which pipe 64 is connected to a source of inert gaseous material such as flue gas, as to provide within the portions of the reactor above the uppermost reaction level an atmosphere of flue gas at sufficient pressure to prevent reactant materials from flowing or diffusing substantially into the unused portion of the contact mass in the reactor. It will be understood that in connection with both differential pressure control 54 and differential pressure control 59, only a portion of the manifolding is shown and that in an operating apparatus, proper provisions would be provided so that the controls effected by either of these instruments could be applied at any appropriate levels within the reactor. Thus, for example, reactant may be substantially excluded from any unused portions of the catalyst column unused for reactant flow by maintaining in said unused portions of the column an atmosphere of an inert gaseous material at pressure levels sufficient to substantially prevent diffusion of adjacent reactant material thereinto.

With the arrangement and method here shown, it will be realized that it is possible to flow a stream of particle form solid contact mass material continuously through a reactor zone, to utilize one portion of the contact mass material in that reactor for a selected reaction, to utilize any other portion of the contact mass in that reactor for another reaction, to prevent substantially the admixture of reactants and reaction products of the two or more reactions, and to prevent unwanted diffusion of reactants into unused portions of the contact mass material within the reactor.

We claim:

1. That method of effecting simultaneously two or more related conversions of hydrocarbons in the presence of the same moving column of particle form solid contact mass material which comprises the steps: flowing the contact mass material as a substantially compact and substantially uninterrupted downwardly moving column of substantially constant cross-section through a confined reaction zone, introducing one hydrocarbon reactant to flow through only a portion of the length of the contact mass column, introducing a second hydrocarbon reactant of different nature to flow through another portion of the column spaced apart from the portion first so used, and substantially preventing passage of either reactant into the portion utilized for the other reaction by so controlling the pressure relationship in the two portions of the contact mass column as to prevent the existence between the two portions of a pressure differential sufficient to cause flow of either reactant through the portion of the contact mass column lying between the two.

2. That method of effecting simultaneously two or more related conversions of hydrocarbons in the presence of the same moving column of particle form solid contact mass material which comprises the steps: flowing the contact mass material as a substantially compact and substantially uninterrupted downwardly moving column of substantially constant cross-section through a confined reaction zone, introducing one hydrocarbon reactant at a point intermediate the ends of the column of contact mass, flowing it through a portion of the length of said column and removing it therefrom near one end thereof, introducing a second reactant of different nature at another intermediate point spaced away from the first introduction point and flowing this second reactant through a portion of the contact mass column toward the other end of the column, and maintaining the pressure of the two reactants at their inlet points in such balance as to minimize flow of either into the portion of the contact mass column between said inlet points.

3. That method of effecting simultaneously two or more related conversions of hydrocarbons in the presence of the same moving column of particle form solid contact mass material which comprises the steps: flowing the contact mass material as a substantially compact and substantially uninterrupted downwardly moving column of substantially constant cross-section through a confined reaction zone, introducing one hydrocarbon reactant at a point intermediate the ends of the column of contact mass, flowing it through a portion of the length of said column and removing it therefrom near one end thereof, introducing a second reactant different in nature from said first reactant at a point in said contact mass column remote from the first point of introduction, flowing the reactant through the contact mass column toward the first point of introduction and removing it from the contact mass column at a point spaced from said first point of introduction, and maintaining such balance between the pressure of the first reactant at the first point of introduction, and the pressure of the second reactant at its point of removal as to minimize flow of either into the portion of contact mass column between said inlet point and said outlet point.

4. That method of effecting simultaneously at least two related conversions of hydrocarbons in the presence of the same moving stream of particle form solid contact mass material which comprises the steps: flowing the contact mass material as a substantially compact and substantially uninterrupted downwardly moving column of substantially constant cross section through a confined reaction zone, introducing a first hydrocarbon reactant to said column to pass through only a section of said column constituting only a portion of the length of said column and separately withdrawing from said section substantially all of the gaseous reaction products from said first hydrocarbon, separately introducing a second hydrocarbon reactant of different nature to said column to flow through a second section constituting another portion of said contact mass column spaced apart from the portion first so used, and separately withdrawing from said second section substantially all of the gaseous reaction products from said second hydrocarbon reactant and maintaining the pressure of the two reactants in said two sections in such balance as to minimize flow of either into the portion of said column between said two sections.

5. That method of effecting simultaneously at least two related conversions of hydrocarbons in the presence of the same moving stream of particle form solid contact mass material which comprises the steps: flowing the contact mass material as a substantially compact and substantially uninterrupted downwardly moving column of substantially constant cross section through a confined reaction zone, separately introducing a first hydrocarbon reactant to said column to pass through only a section of said column spaced from one end thereof and constituting only a portion of the length of said column and separately withdrawing from said section substantially all of the gaseous reaction products from said first hydrocarbon, separately introducing a second hydrocarbon reactant different in nature from said first reactant to said column to flow through a second section constituting another portion of said contact mass column spaced apart from the portion first so used and spaced from the opposite end of said column, separately withdrawing from said second section substantially all of the gaseous reaction products from said second hydrocarbon reactant, and maintaining an atmosphere of inert gaseous material in the portions of the length of said contact mass column unused for reactant flow at pressure levels sufficient to substantially prevent diffusion of reactant material thereinto.

6. That method of effecting simultaneously at least two related conversions of hydrocarbons in the presence of the same moving stream of particle form solid contact mass material which comprises the steps: flowing the contact mass material as a substantially compact and substantially uninterrupted downwardly moving column of substantially constant cross section through a confined reaction zone, introducing a first hydrocarbon reactant to said column to pass through only a section of said column substantially spaced from one end thereof and constituting only a portion of the length of said column and separately withdrawing from said section substantially all of the gaseous reaction products from said first hydrocarbon, introducing a second hydrocarbon reactant of different nature to said column to flow through a second section constituting another portion of said contact mass column spaced apart from the portion first so used and substantially spaced from the opposite end of said column, separately withdrawing from said second section substantially all of the gaseous products from said second hydrocarbon reactant, maintaining the pressure of the two reactants in said two sections in such balance as to minimize flow of either into the portion of said column between said two sections and maintaining an atmosphere of a substantially inert gaseous material in the end portions of the length of said column adjacent said two sections at pressure levels sufficient to substantially prevent diffusion of reactant material thereinto.

EDWARD L. SINCLAIR.
WILLIAM A. HAGERBAUMER.

REFERENCES CITED

The following references are of record in the file of this patent:

UNITED STATES PATENTS

| Number | Name | Date |
|---|---|---|
| 2,304,183 | Layng et al. | Dec. 8, 1942 |
| 2,331,433 | Simpson et al. | Oct. 12, 1943 |
| 1,977,684 | Lucke | Oct. 23, 1934 |
| 2,222,585 | Riggs | Nov. 19, 1940 |
| 2,239,801 | Voorhees | Apr. 29, 1941 |
| 2,270,715 | Layng | Jan. 20, 1942 |
| 2,290,580 | Degnen et al. | July 21, 1942 |
| 2,234,505 | Schulze | Mar. 11, 1941 |
| 1,852,227 | Barstow et al. | Apr. 5, 1932 |
| 2,094,946 | Hubmann | Oct. 5, 1937 |
| 2,351,214 | Kaufmann et al. | June 13, 1944 |
| 2,338,573 | Creelman | Jan. 4, 1944 |
| 1,100,397 | Reynolds | June 16, 1914 |
| 2,364,453 | Layng et al. | Dec. 5, 1944 |
| 2,344,449 | Ogorzaly | Mar. 14, 1944 |
| 2,376,365 | Lassiat | May 22, 1945 |
| 2,372,018 | Ruthruff | Mar. 20, 1945 |
| 2,357,136 | Rubin | Aug. 29, 1944 |
| 2,362,196 | Frey | Nov. 7, 1944 |
| 2,362,621 | Fahnestock | Nov. 14, 1944 |
| 2,356,611 | Peters | Aug. 22, 1944 |